Aug. 14, 1962  E. R. WOLCOTT  3,049,422
PROCESS FOR RECOVERING VALUABLE RARE METALS BY VOLATILIZATION
Filed Dec. 8, 1959
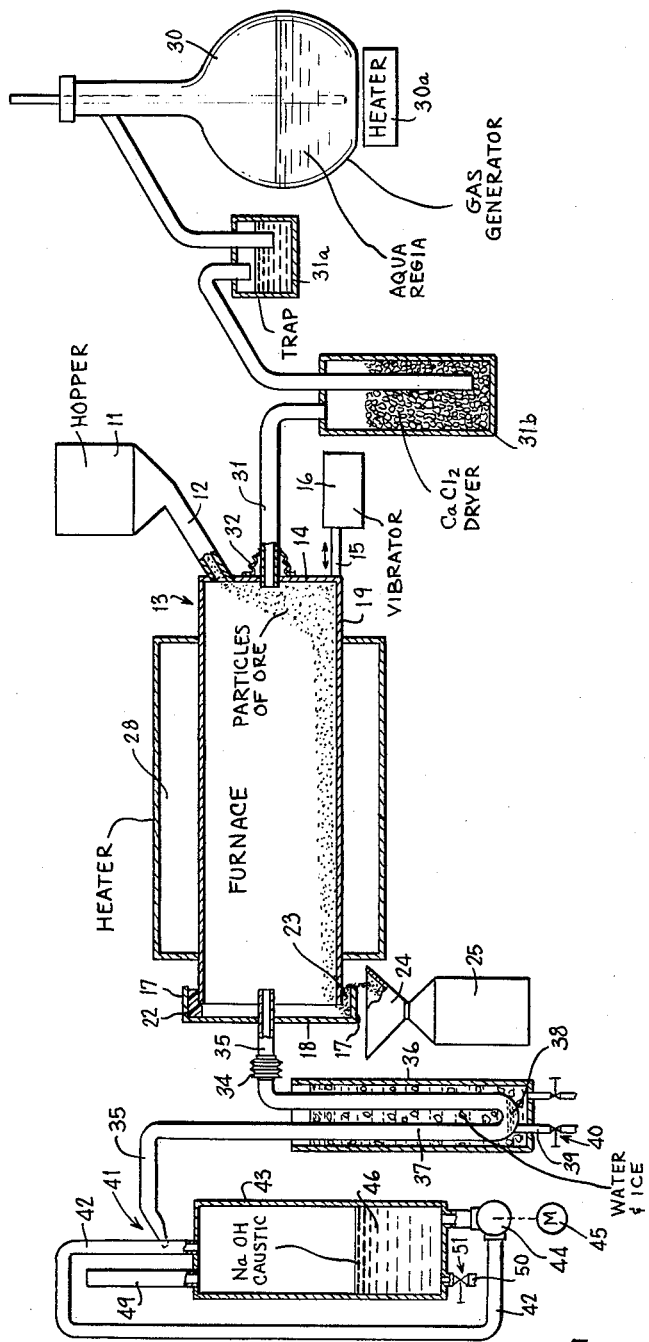
INVENTOR.
EDSON R. WOLCOTT
BY
ATTORNEY United States Patent Office 3,049,422
Patented Aug. 14, 1962

3,049,422
PROCESS FOR RECOVERING VALUABLE RARE METALS BY VOLATILIZATION
Edson R. Wolcott, 917 Crenshaw Blvd., Los Angeles, Calif.
Filed Dec. 8, 1959, Ser. No. 858,208
5 Claims. (Cl. 75—63)

This invention is concerned with a process for the recovery of certain metals from ores, including crude ores, tailings, sands or ore concentrates. More specifically, it is contemplated that the metals to be recovered shall include valuable, relatively rare, metals of the group composed of gold, platinum and platinum compounds.

This invention is particularly beneficial for use in cases where the ore containing a metal to be recovered, is below the grade required for economic recovery by methods heretofore known. In other words, by means of this invention it becomes feasible to recover a valuable metal such as platinum or gold, for example, from an ore containing such minute quantities of the metal, or in such an unusual form, that a normal assay of the ore indicates only a trace or none at all of the desired metal.

It is an object of this invention to provide a gas separation and recovery process for economically recovering feasible quantities of a desired valuable metal such as platinum or gold from a low grade ore containing the metal.

Another object of the invention is to provide a process for continuously passing a finely divided ore containing a metal of the group composed of gold, platinum and platinum compounds at an elevated temperature through a furnace and continuously passing a gas containing a mixture of nitrosyl chloride and chlorine generated by warming aqua regia through the furnace in contact with the finely divided ore in order to cause the gas to combine chemically with the metal or metal compound so that a metallic compound or salt in gaseous form is produced. This gaseous metallic compound or salt is then removed from the residue of the ore and condensed to liquid form and drawn off to be reduced thereafter to the pure metal, by means of heat, or by some other standard procedure.

Briefly, the invention provides a process for recovering valuable rare metals of the group composed of gold, platinum, and platinum compounds, from a finely divided ore which contains limited quantities thereof. Such method comprises the steps of taking ore having a surface exposure in the order of that which will pass a twenty mesh screen, or finer, and of passing a gas composed of a mixture of nitrosyl chloride and chlorine over said ore in a highly heated chamber, said gas being one which will combine chemically only with the metals of said group to form a gas at the temperature found in said chamber. The process also includes the steps of separating the gas from the residual ore, cooling it to condense the gas to a liquid, and drawing off said liquid and heating or otherwise processing the same to reduce the metal out in a substantially pure state. For example, the reduction of the pure metal may be accomplished by precipitating the platinum metals, or gold, with copper or zinc.

One particular embodiment of the invention is described in greater detail below and illustrated in the drawing in which the FIGURE shows schematically a system including necessary elements for carrying out the invention.

Referring to the figure of drawing, it will be observed that there is a hopper 11 where the crushed ore may be deposited. Connected to the bottom of the hopper 11 there is a chute or tubular passage 12 that carries the crushed ore to one end of a chamber 13.

The ore, as employed in this treatment, is in a state such that the largest particles are about that which will pass a twenty mesh screen (which is in the order of the size of ordinary sand). This size limitation is not necessarily a very exacting requirement, but it has been found that it is usually not necessary to grind the ore any finer than twenty mesh screen size. However, in some cases it is advantageous to produce much finer particles by crushing or grinding the ore or sand to a size resembling table salt.

The ore particles from hopper 11 flow down beside an end wall 14 of the chamber 13 and spread out on a bottom surface 19 of the chamber 13. Connected to the chamber 13 by a metal rod 15 or other solid mechanical connection, there is a vibration, or oscillation mechanism 16 for vibrating the chamber 13 in order to cause the particles of ore to spread out in an even thickness layer and travel horizontally along the bottom of the chamber 13, until they reach the left end (as viewed in the figure of the drawing) where they are discharged by falling out onto an over-lapping flange 17. This flange 17 is part of an end plate 18 that closes the left end of the chamber 13.

The oscillating or vibrating mechanism 16 may be any of a large number of well known mechanisms for creating the desired shaking motions of the chamber, and as such forms no part of this invention per se. One commercial machine has controls for regulating the action so that the ore can be caused to travel at any desired rate down to a standstill. Such a machine is known as a "Syntron."

It will be noted that around the upper sides of the left end of chamber 13 there is a resilient material seal 22 that is fastened to the flange 17, and to the inside of the peripheral edge of the plate 18. The seal 22 has dimensions such that the material of the seal 22 is deformed by the edge of chamber 13, so as to create a sufficiently tight seal at this end of the chamber for preventing escape of the gases contained within the chamber. Along the bottom edge of the chamber 13 a self-sealing takes place by reason of the fact that the particles of ore pile up and fill the over-lapping space 23, between the left hand edge of bottom surface 19 of chamber 13 and the over-lapping portion of flange 17. It will be observed that the ore may continue to flow out of the chamber 13 by reason of its falling over the open edge of the flange 17, and down into a funnel 24 that is attached to the top of a bin or receptacle 25 for receiving the residual material, after recovery of the desired metal.

It will be noted that there is a heating chamber 28 which surrounds chamber 13 over the major portion thereof. Thus the ore and gas contained within the chamber 13 are heated to a given desired temperature. It will be appreciated that the heating chamber 28 may have inlet and outlet openings (not shown) for allowing passage of hot combustion products. Or, if desired, the heating of the chamber 13 may be accomplished by electric heating elements (not shown) or the like arrangement.

For introducing the necessary gas to the chamber 13, there is a gas generator 30 that has an outlet pipe 31 connected into the chamber 13 through its end wall 14, via a bellows type seal 32. It is usually desirable to provide a trap 31a and a drying chamber 31b in order to prevent back flow of gases from the furnace chamber 13 and to dry the gases before they enter the chamber. The bellows seal arrangement is provided in order to allow the vibration or oscillation of the chamber 13 to take place without affecting the pipe 31 or gas generator 30. After the gas has circulated within the chamber 13 and passed over and around the ore particles as they are moved along the floor of the chamber, the gas is withdrawn from the left end of the chamber 13 via a pipe 35 which leads into a condenser 36. Condenser 36 may employ ice and water as indicated for cooling a U-bend section 37 in the pipe 35. There is a bellows coupling 34 which connects the tube or pipe 35 with the input end of the U-bend 37, to allow for expansion and to insulate the cold condenser from the hot furnace. The condensed liquid within U-bend 37 gathers at the bottom thereof, as shown at reference number 38. This liquid 38 may be withdrawn via a vertical pipe 39 which has a valve 40 therein for controlling the flow therethrough.

Remaining gases and fumes, following the condensation within U-bend section 37, are drawn through by an aspirator 41. An aspirator of this sort may take various forms, but that contemplated includes a venturi, or jet action, structure which is located in a pipe 42 which carries liquid being pumped from the lower portion of a tank 43. There is a pump 44 that is shown located at an elbow of the pipe 42, which is driven by a motor 45. A body of liquid 46 within the tank 43 is a caustic solution such as NaOH. There is a breather pipe 49 extending from the top of the tank 43. Also, there is a drain pipe 50 having a valve 51 therein, for changing the liquid within tank 43.

Operation

The operation of the process according to this invention as carried out by the particular apparatus illustrated in the drawings, is as follows:

The oscillating mechanism 16 is started up so that the rod 15 may transmit the desired movements to the chamber 13 for causing it to be oscillated or vibrated therewith. This oscillation may be regulated so as to control the rate of travel of the ore across the floor of the chamber 13, so that the most efficient rate may be employed for recovering the desired metal of the group consisting of gold, platinum and compounds thereof from the ore containing the same.

Thus the finely divided ore from the hopper 11 flows down through passage 12 and after reaching the floor or bottom surface 19 of chamber 13, travels horizontally to the left (as viewed in the drawing) across the chamber 13. At the same time the heating chamber 28 will have been fired up or electrically heated to provide the necessary temperature within chamber 13. Now the particular gas, viz. nitrosyl chloride plus chlorine to be employed will be produced by warming aqua regia in the generator 30. This gas will then pass through the pipe 31 into the chamber 13. Such movement of the gas is caused by a drawing action created by the aspirator 41 in a manner to be more fully described below.

As the ore travels across the floor of the chamber 13, the gas from generator 30 which now fills the chamber 13, passes over and mingles with the ore at a predetermined relatively high temperature which may vary from 100° F. to 1600° F. The temperature is such that a chemical action then takes place which causes substantially all of the desired metal in the ore, but only such desired metal, to combine with the gas, forming a compound or salt of the desired metal in gaseous form. This metallic compound or salt (gas) is then drawn off through the pipe 35 into the condenser 36 where low temperatures set up around the U-bend section 37 cause a condensation of the metallic compound or salt to a liquid state so that it collects at the bottom of the U-bend section 37. This liquid 38 is then drawn off either continuously or periodically via the pipe 39 and valve 40 to be given a reduction treatment for recovering the metal from its compound or salt. The reduction treatment is not illustrated since well known methods are available to produce the metal from the condensate. In many cases the treatment is relatively simple and requires merely the step of heating the liquid to reduce the same, by driving off the gaseous constituents leaving substantially pure metal as the reduction product. In some cases the condensate from the U-bend condenser will carry more than one metal, e.g. platinum (Pt) and gold (Au). These are separated from each other and reduced to the metal by standard methods. It is pointed out that the standard methods of reducing the desired metal out from its compound state, may include other than mere heating, although the latter is the simplest where feasible.

Remaining gases are drawn on through the condenser 36 via the remaining portion of the pipe 35, and the aspirator 41. In the aspirator 41 the well known venturi effect creates a reduced pressure at the nozzle or tip of the passage within pipe 35. This is by reason of the relatively high velocity flow of the liquid 46 past this nozzle or tip of the pipe 35, as it is pumped from the body of liquid in the bottom of the tank 43 on around through the pipe 42. Thus gases are drawn through the circuit for gas flow which begins at gas generator 30 and continues via pipe 31, the inside of chamber 13, pipe 35 (including U-bend 37), nozzle of aspirator 41, and the space within tank 43 above the level of the liquid. In this manner gases which remain in the tube 35 following condensation at the condenser 36, are throughly mixed with the caustic solution 46, and may be recovered after a given period of time when sufficient concentration of the metallic compound in this liquid has been reached.

The particular preferred process involving specific examples of the gases to use in recovering gold, platinum and compounds thereof is as follows:

With ores or sands containing any of the platinum group of metals or containing gold, the gas which I employ is a combination of two gases, nitrosyl chloride and chlorine. This combination is produced when aqua regia is boiled, which requires a moderate temperature, or when concentrated nitric acid acts upon concentrated hydrochloric acid. The products of the reaction are—

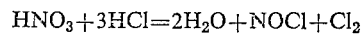

$$HNO_3 + 3HCl = 2H_2O + NOCl + Cl_2$$

For example, aqua regia is placed in the gas generator 30 and mild heat applied thereto by heater 30a sufficient to boil the liquid. The gases and vapors so produced pass through trap 31a and then through a drying chamber 31b containing $CaCl_2$ or other suitable compound which will extract the water and leave the $NOCl$ and $Cl_2$ mixture which is passed through the furnace 13.

The action which takes place is the volatilization of only the desired platinum group metal, or the gold, to form chlorides therewith which are in a gaseous form at the temperature in the chamber 13 but condense to liquid form when cooled. At the same time any iron in the ore is transformed into iron oxide which prevents any of the iron from volatilizing. The temperatures employed are such that no undesired product is volatilized.

In regard to this example given above, it is pointed out that this recovery process has been used with black sands carrying over ninety percent iron oxides, without getting any iron in the product recovered.

This application is a continuation-in-part of my copending application Serial No. 590,294, filed June 8, 1956, for Method and Apparatus for Recovering Valuable Rare Metals, now abandoned.

I claim:

1. A process for separating and recovering metals of the group composed of gold, platinum, and platinum compounds from finely divided ore containing metals of said group which comprises treating the finely divided ore with a gaseous mixture of nitrosyl chloride and chlorine produced from aqua regia, at a temperature sufficiently high to cause only the metals of said group to form volatile compounds, and separating said volatile compounds from the residue of the ore.

2. A continuous process for the separation and recovery of the group composed of gold, platinum and compounds thereof, from finely divided ore containing the metals of said group which comprises passing the ore continually through a furnace chamber and treating the ore as it passes through the furnace with a gaseous mixture of nitrosyl chloride and chlorine produced from aqua regia, the temperature in the furnace being such that only the metals of the aforesaid group react with the ore to produce volatile compounds, and recovering said volatile compounds from the residue of the ore.

3. A process for separating and recovering platinum from finely divided ores which consists of treating said ore with mixed vapors of nitrosyl chloride and chlorine produced from aqua regia at a temperature sufficient only to form volatile compounds with the platinum and removing said volatile compounds from the residue of the ore, and recovering the metal platinum from said compounds.

4. A process for recovering metals included in the group composed of gold, platinum and platinum compounds, comprising the steps of taking ore containing metals of said group having a surface exposure in the order of that which will pass a 20-mesh screen, heating aqua regia to vaporize the same, passing the nitrosyl chloride and chlorine thus formed over said ore at an elevated temperature sufficient only to volatilize at least one metal of said group, condensing the volatile compound of the metal thus formed to a liquid state and reducing said metal to a substantially pure state.

5. A process for separating and recovering platinum from ore containing platinum and iron, comprising the steps of heating ore having a surface exposure in the order of that which will pass a 20-mesh screen, passing a gaseous mixture of nitrosyl chloride and chlorine having the formula $NOCl+Cl_2+2H_2O$ over said ore at a temperature sufficiently high to volatilize the platinum without volatilizing the iron, whereby a separation of platinum is effected.

References Cited in the file of this patent
UNITED STATES PATENTS

| | | |
|---|---|---|
| 137,375 | Lundquist | Apr. 1, 1873 |
| 936,545 | Kitsee | Oct. 12, 1909 |
| 1,427,765 | Layng | Aug. 29, 1922 |
| 1,593,022 | Knight | July 20, 1926 |
| 1,671,003 | Bagsar | May 22, 1928 |
| 1,814,392 | Low et al. | July 14, 1931 |
| 2,011,533 | Wood | Aug. 13, 1935 |
| 2,041,811 | Betterton et al. | May 26, 1936 |
| 2,733,983 | Daubenspeck | Feb. 7, 1956 |
| 2,752,301 | Cooper | June 26, 1956 |

OTHER REFERENCES

Smith: Inorganic Chemistry, 3rd edition, 1921, published by The Century Co., New York, pages 536, 537.

Cottrell: Manufacture of Acids and Alkalis, vol. VI, Nitric Acid and Nitrates, D. Van Nostrand Co., 1923, New York, pages 342, 343.